(12) United States Patent
Mueller et al.

(10) Patent No.: US 8,355,497 B2
(45) Date of Patent: *Jan. 15, 2013

(54) PROVISION OF TELECOMMUNICATION SERVICES

(75) Inventors: Goetz Mueller, Weissach (DE); Martin Goetzer, Backnang (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 904 days.

This patent is subject to a terminal disclaimer.

(21) Appl. No.: 12/513,812

(22) PCT Filed: Nov. 6, 2006

(86) PCT No.: PCT/EP2006/068149
§ 371 (c)(1),
(2), (4) Date: May 26, 2009

(87) PCT Pub. No.: WO2008/055540
PCT Pub. Date: May 15, 2008

(65) Prior Publication Data
US 2010/0020789 A1    Jan. 28, 2010

(51) Int. Cl.
*H04M 5/00*    (2006.01)

(52) U.S. Cl. ........ 379/326; 379/327; 379/328; 379/329; 379/334; 379/397

(58) Field of Classification Search ................... 379/242, 379/327, 248, 325, 329, 330
See application file for complete search history.

(56) References Cited

FOREIGN PATENT DOCUMENTS
WO      01/45452 A2    6/2001
WO   2006/122699 A1   11/2006

*Primary Examiner* — Joseph J Nguyen
(74) *Attorney, Agent, or Firm* — Coats & Bennett, P.L.L.C.

(57) ABSTRACT

An apparatus (100) suitable for providing telecommunication and data services in a telecommunications network to a plurality of subscribers, comprising a first distribution matrix (104), a crossover matrix (108) and a second distribution matrix (106). Said crossover matrix (108) is adapted to be connected to a main cable (130) and to a distribution cable (120). The apparatus further comprises a DSLAM unit (112) and crossover switching elements in said crossover matrix (108) and distribution switching elements in said distribution matrices (104, 106) are controlled from a remote location. The apparatus is adapted to add data services to a subscriber line by switching the subscriber line from the crossover matrix (108) to the first distribution matrix (104) and then via splitter (110) to the second distribution matrix (106) and back to the crossover matrix (108), wherein the splitter (110) is adapted to receive data signal from the DSLAM unit (112).

35 Claims, 5 Drawing Sheets

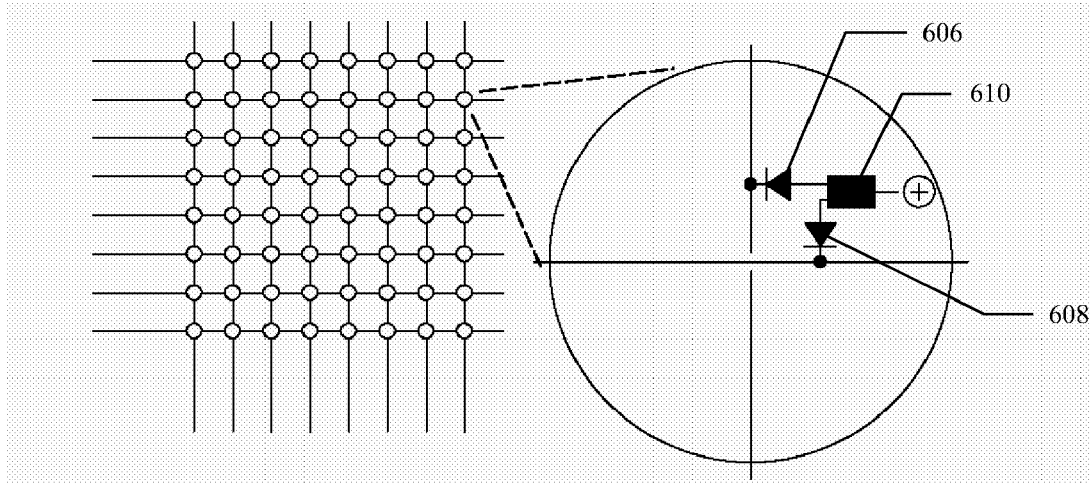
*FIG. 6a*
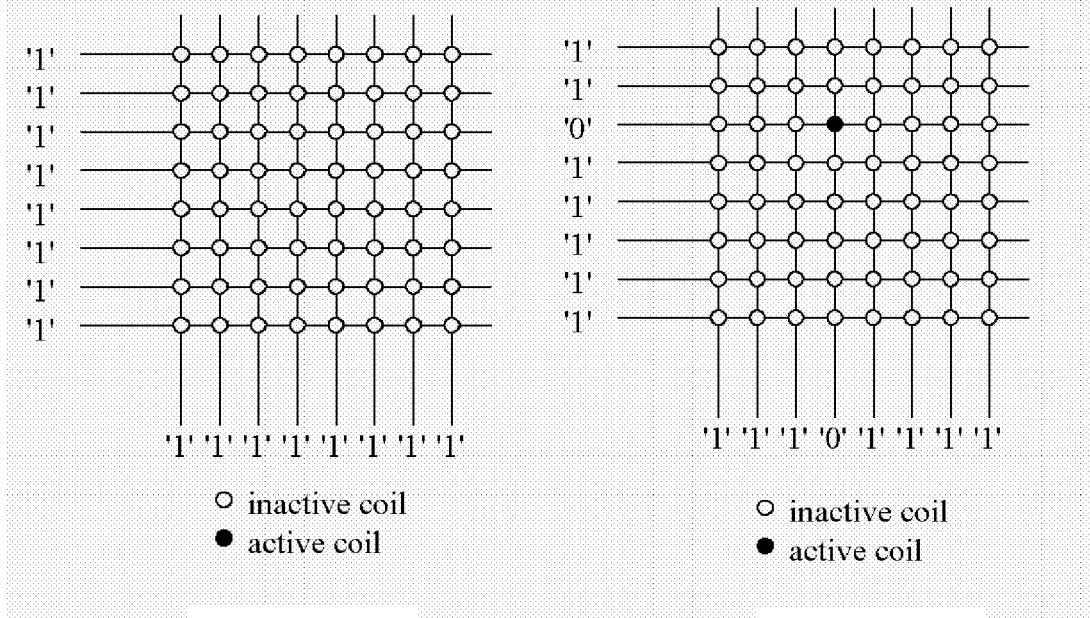
*FIG. 6b*  *FIG. 6c*

PROVISION OF TELECOMMUNICATION SERVICES

FIELD OF THE INVENTION

The present invention relates in general to an apparatus and a method for providing telecommunications and data services to users and in particular to an apparatus and a method of switching-in new broadband services and switching-out obsolete services.

BACKGROUND OF THE INVENTION

Current telecommunications networks can supply a variety of telecommunications services to customers such as Plain Old Telephone Services (POTS), Digital Subscriber Lines (DSL) or Integrated Services Digital Network (ISDN) lines. These services are supplied via customer subscriber lines which are typically copper cables connected to a customer Main Distribution Frame (MDF). The customer MDF is usually located in a service box in the street cabinet near to the customer's premises. A Multi-Service Access Node (MSAN) is connected to a provider MDF which is also located in the service box. To supply a particular telecommunications service to a customer the service provider must make connections between the customer MDF and the provider MDF. However the data rates of the broadband services strongly depends on the distance from the distribution box to the end subscriber. This means that in order to provide broadband services at high bitrates telecom operators must shorten the distance from the distribution box to subscribers. Obvious consequence of that is increase of the number of distribution boxes and equipment installed there, which also means that more field engineers is required to services these boxes. This is something that the telecom operators must keep under control and there is a need of having installed in the distribution boxes cheap equipment (i.e. low capital expenditure— CAPEX) and equipment that is service free or almost service free (low operational expenditure—OPEX). One of these emerging on the market broadband services is Very-High-Data-Rate Digital Subscriber Line (VDSL) and its second generation VDSL2 technology. Very-High-Data-Rate Digital Subscriber Line (VDSL) is a broadband technology providing much higher data rates than other xDSL technologies over relatively short distances (between 51 and 55 Mbps over distance up to 1200 m in length from the distribution box). VDSL 2 uses different to VDSL part of the spectrum and has speed up to 100 Mbps at a range of 3500 m. With such good characteristics the VDSL (and VDSL 2) services can be really successful on the market providing that the cost of equipment, cost of its installation and maintenance is low.

Hence, an improved apparatus and method of switching-in new connections and switching-out obsolete connections would be advantageous and in particular one that allows for performing the operations without, or with significantly reduced, the need for service engineer making the connections in the service box deployed in the field.

Accordingly, the invention seeks to preferably mitigate, alleviate or eliminate one or more of the disadvantages mentioned above singly or in any combination.

According to a first aspect of the present invention, as defined in claim 1, there is provided an apparatus suitable for providing telecommunication and data services in a telecommunications network to a plurality of subscribers. The apparatus comprises a first distribution matrix connected to a crossover matrix and a second distribution matrix connected to said crossover matrix. Said crossover matrix comprises a plurality of 2×2 crossover switching elements and is adapted to be connected to a main cable and to a distribution cable. The apparatus further comprises a Digital Subscriber Line Access Multiplexer. Crossover switching elements in said crossover matrix and distribution switching elements in said distribution matrices are controlled from a remote location. The apparatus is adapted to add data services to a subscriber line by switching the subscriber line from the crossover matrix to the first distribution matrix and from the first distribution matrix via means for combining and/or separating low frequency voice signal and high frequency data signal to the second distribution matrix and back to the crossover matrix, wherein the means for combining and/or separating is adapted to receive the high frequency data signal from the Digital Subscriber Line Access Multiplexer.

According to a second aspect of the present invention, as defined in claim 15, there is provided a telecommunications network including a broadband network for providing at least one data service and an apparatus suitable for providing telecommunication and data services to a plurality of subscribers. The apparatus comprises a first distribution matrix connected to a crossover matrix and a second distribution matrix connected to said crossover matrix. The crossover matrix comprises a plurality of 2×2 crossover switching elements and is adapted to be connected to a main cable and to a distribution cable. The apparatus further comprises a Digital Subscriber Line Access Multiplexer. Crossover switching elements in said crossover matrix and distribution switching elements in said distribution matrices are controlled from a remote location. The apparatus is adapted to add data services to a subscriber line by switching the subscriber line from the crossover matrix to the first distribution matrix and from the first distribution matrix via means for combining and/or separating low frequency voice signal and high frequency data signal to the second distribution matrix and back to the crossover matrix, wherein the means for combining and/or separating is adapted to receive the high frequency data signal from the Digital Subscriber Line Access Multiplexer.

According to a third aspect of the present invention, as defined in claim 30, there is provided a method of operating a telecommunications network in which a broadband network provides at least one data service. In the network, a plurality of subscriber lines are connected to said network through a crossover matrix comprises a plurality of 2×2 crossover switching elements and on request to add a data service to a subscriber line a crossover switching element of the crossover matrix, the crossover switching element being associated with said subscriber line, switches electrically the subscriber line on a subscriber cable side of the crossover matrix to a second distribution matrix. On a main cable side of the crossover matrix said crossover switching element associated with said subscriber line switches said subscriber line to a first distribution matrix. The distribution matrices switch the subscriber line to their ports connected to means for combining and/or separating low frequency voice signal and high frequency data signal and said means for combining and/or separating combines the low frequency voice signal with high frequency data signal received from Digital Subscriber Line Access Multiplexer. The crossover switching elements in the crossover matrix and distribution switching elements in the distribution matrices receive control signals from a remote location.

Further features of the present inventions are as claimed in the dependent claims.

The present invention beneficially allows for building a switching apparatus for use in street cabinets, which require significantly smaller number of basic switching elements.

Additional benefit is that the invention can be easily installed in the network and the installation process is limited to cutting the existing cable and connecting the two ends to connectors of the apparatus according to the present invention and additionally connecting the cable providing the broadband services and a power supply cable. The apparatus does not require servicing and can be enclosed in a sealed box, which has the advantage that it can be placed even in a harsh environment even without using a street cabinet. The present invention is a scalable solution and allows for easy increase of availability of high data rate broadband services that follows subscribers' demand. Additional benefit is that the present solution allows avoiding building new street cabinets. Cost of these new cabinets may be high due to the fact that they must comply with environmental conditions of active equipment and that larger, noisier cabinets may not be allowed. Obviously it is worth to note that the cost of installation for cabinet-based installations is higher than that of non-cabinet installations.

BRIEF DESCRIPTION OF THE DRAWINGS

The present invention will be understood and appreciated more fully from the following detailed description taken in conjunction with the drawings in which:

FIG. 6a-c are diagrams illustrating arrangement and operation of relay elements in an X-Y matrix in accordance with one embodiment of the present invention;

DESCRIPTION OF EMBODIMENTS OF THE INVENTION

The term "main cable" also referred to as "central office cable" herein below refers to a cable that connects the apparatus to the central office (cable on the network side).

The term "distribution cable" also referred to as "subscriber cable" herein below refers to a cable that provides connections to subscriber devices (cable on the subscriber side comprising plurality of subscriber lines).

For the sake of clarity the drawings present the invention in a very schematic way with elements and lines not essential for understanding the invention omitted.

Figure 1:
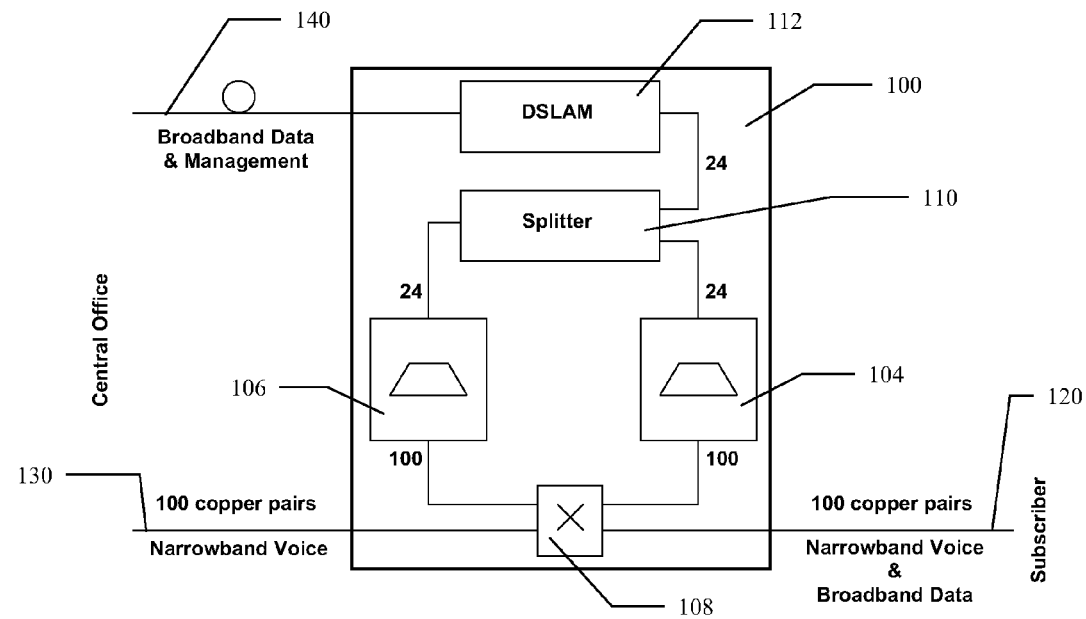
FIG. 1 is a block diagram illustrating an apparatus for providing telecommunication and data services in a telecommunications network in accordance with one embodiment of the present invention.

With reference to FIG. 1 an apparatus for providing telecommunications and data services in a telecommunications network to a plurality of subscribers is presented.

The apparatus 100 comprises a first distribution matrix 104 connected to a crossover matrix 108 and a second distribution matrix 106 connected to said crossover matrix 108. The crossover matrix 108 is connected on its one side to a main cable 130 and on the opposite side to a distribution cable 120. Switching elements (i.e. crossover switching elements 202 and distribution switching elements 302 and 304) for switching of connections within said crossover matrix 108 and distribution matrices 104, 106 are controlled from a remote location. These switching elements are responsible for establishing an electrical connection through the crossover matrix 108 and the distribution matrices 104, 106. The apparatus 100 further comprises a splitter 110 and a Digital Subscriber Line Access Multiplexer 112. The first distribution matrix 104 and the second distribution matrix 106 are connected to the splitter 110. The splitter 110 is a passive component that separates/combines low frequency (POTS or ISDN) and high frequency (data) parts of the signal. The splitter 110 is also connected to the Digital Subscriber Line Access Multiplexer (DSLAM) 112, which, in turn is connected to the data part of the network. However, it is within contemplation of the present invention that DSLAM 112 can be connected to a node providing only data services.

The DSLAM unit 112 and the broadband network in one embodiment can be connected, 140, via a fibre optic line or in alternative embodiment using wireline connection and gigabit Ethernet link. The DSLAM unit 112 receives via the link 140 data services and provides said data services further to the end subscribers. In one embodiment the data services provided by DSLAM unit are compliant with Very-High-Data-Rate Digital Subscriber Line (VDSL) technology, which allows for data rates up to 55 Mbps over a distance up to 1200 m from the DSLAM unit 112. Alternatively or additionally the data services provided by DSLAM unit are compliant with Very-High-Data-Rate Digital Subscriber Line 2 (VDSL2) technology, which allows for data rates up to 100 Mbps over a distance up to 3500 m from the DSLAM unit 112. In yet another alternative embodiment the DSLAM unit 112 can provide data services in other xDSL technologies, or any other high bitrate service that has limited reach of signal and requires active equipment in locations outside of the central office.

Figure 4:
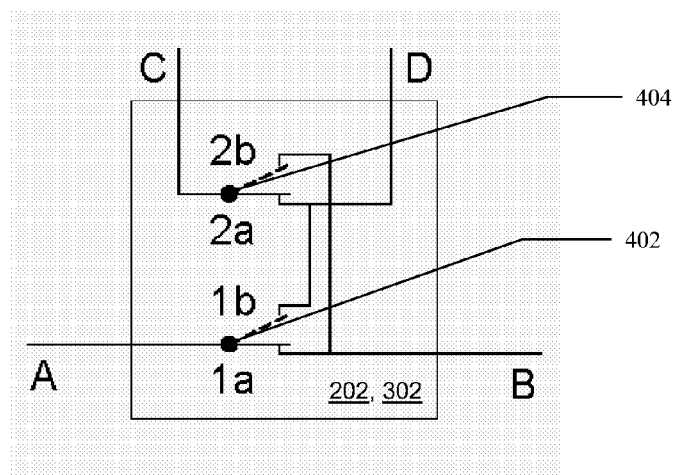
FIG. 4 is a schematic diagram illustrating a 2×2 switching element used in devices in accordance with one embodiment of the present invention.
Figure 2:
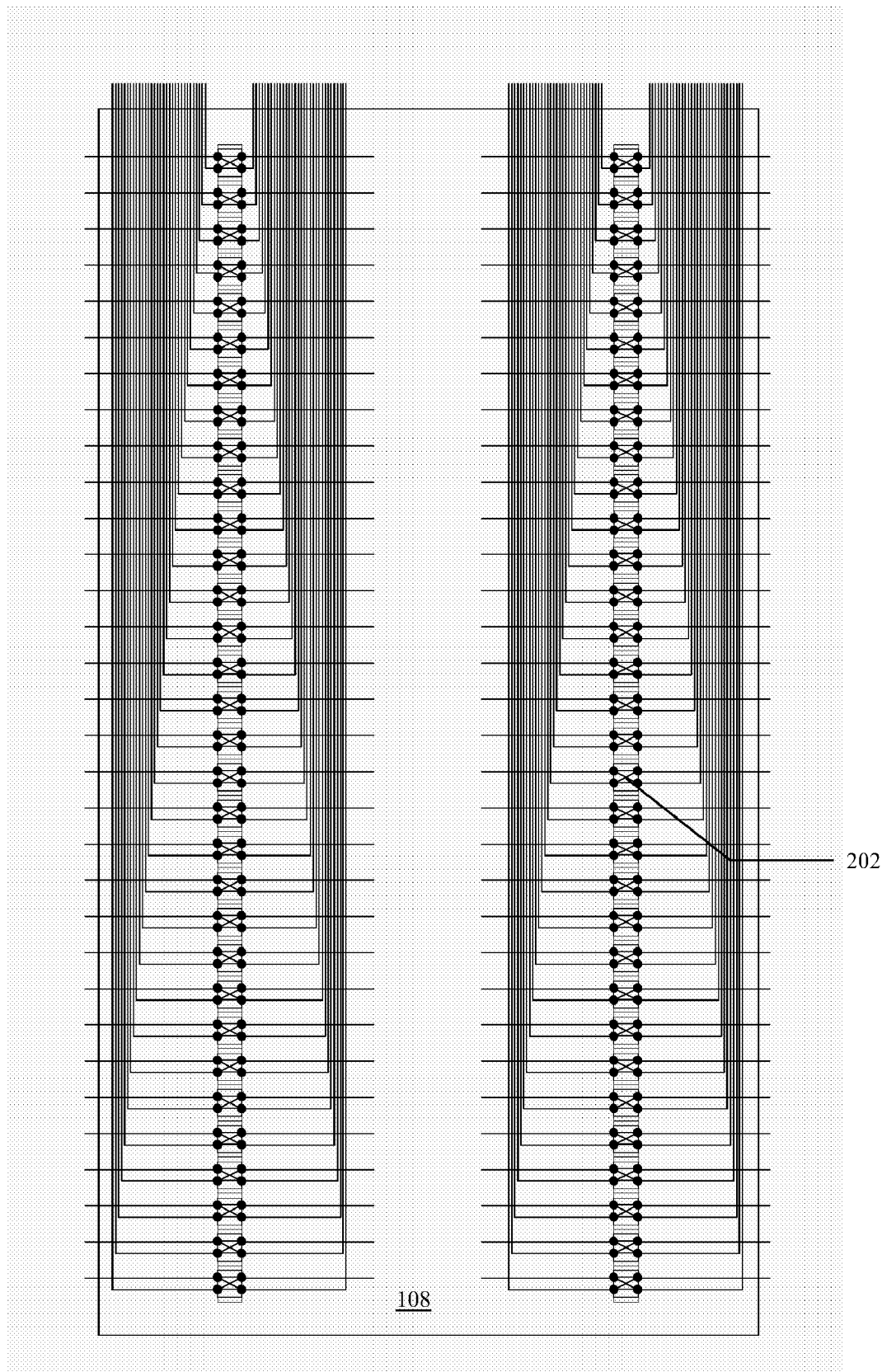
FIG. 2 is a diagram illustrating arrangement of crossover switching elements in a crossover matrix in accordance with one embodiment of the present invention.

With reference to FIG. 2 the crossover matrix 108 is presented. The crossover matrix 108 comprises a plurality of 2×2 crossover switching elements 202. The 2×2 notation relates to 4 ports of the crossover switching element. The crossover switching element is presented in FIG. 4 and it consists of four ports (A-D) and two relays 402 and 404. The switches allow for connection of port A to port B and connection of port C to port D (this is so called passthrough connection—relays 402 and 404 in positions 1a and 2a respectively). Alternatively the switches allow for connecting port A to port D and connecting port B to port C (this is so called crossover connection—relays 402 and 404 in positions 1b and 2b respectively). Because the relays 402 and 404 in the crossover switching element are operated independently there is yet another alternative configuration in which port A is connected to ports C and D and port B is isolated (relays 402 and 404 in positions 1b and 2a respectively). In configuration when relays 402 and 404 are in positions 1a and 2b ports C, A and B are connected and port D is isolated.

Because one line consists of two twisted copper wires said one line requires two switching elements to correctly switch the line between ports, but for the sake of clarity only one switching element per line is presented in the figures. Similarly, in the description of operation of crossover and distribution matrices and other element of the apparatus 100 reference to only one switching element per line is made, but it is clear that the same relates to the second wire in the twisted copper pair and is omitted in the description for the clarity reason mentioned above.

In the example shown in FIG. 2 there are 64 separate crossover switching elements that serve 64 subscriber lines. The function of the crossover switching element 202 is to connect the subscriber connected to port A directly to port B to which the main cable 130 is connected or to connect said subscriber line connected to port A to port D, which in turn is connected to the second distribution matrix 106 and at the same time to connect the main cable connected to port B to port C, which in turn is connected to the first distribution matrix 104. Although the embodiment illustrated in FIG. 2 presents 64 2×2 crossover switching elements 202 it is clear that similar arrangement with, for example, 100 elements 202 is possible as it is schematically illustrated in FIG. 1. The numbers next to lines connecting components in FIG. 1 are the numbers of twisted copper pairs connected to ports of the components in one embodiment of the present invention.

Figure 3:
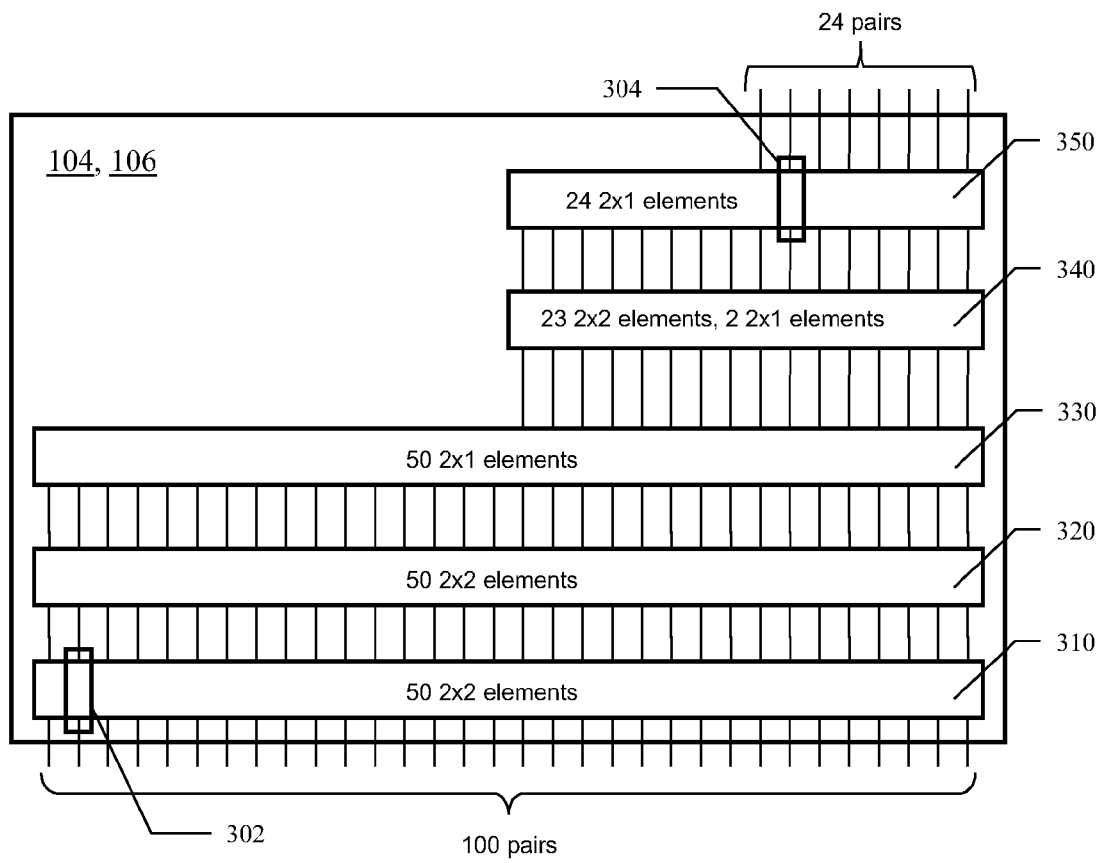
FIG. 3 is a diagram illustrating arrangement of distribution switching elements in a distribution matrix in accordance with one embodiment of the present invention.
Figure 7:
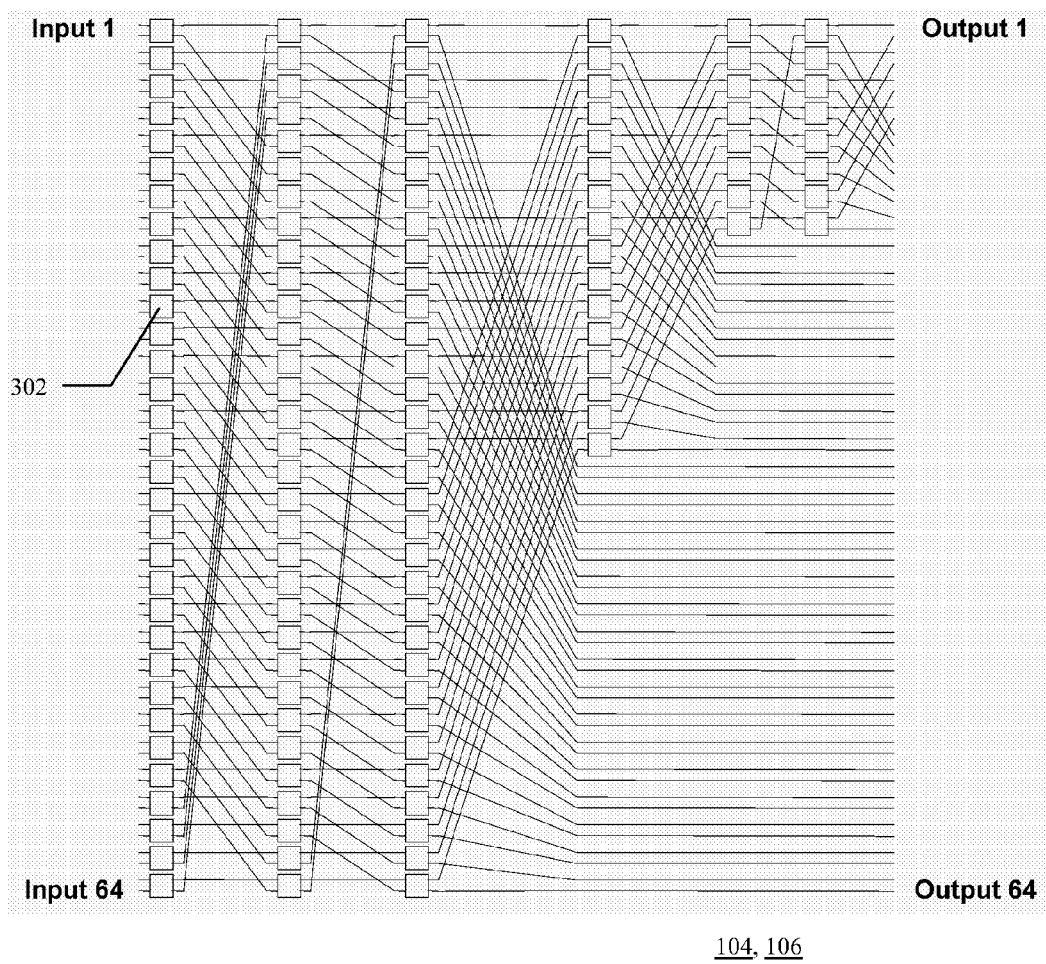
FIG. 7 is a diagram illustrating alternative arrangement of distribution switching elements in a distribution matrix in accordance with one embodiment of the present invention.

With reference to FIG. 3 one implementation of a distribution matrix 104 and 106 is shown. In the illustrated example the distribution matrix has 100 ports in a first bank, 310, of the 2×2 distribution switching elements 302 and 24 ports the fifth bank, 350, of the 2×1 distribution switching elements 302. Switching within the matrix 104 is carried out by a plurality of 2×2 and 2×1 distribution switching elements 302 and 304 arranged in banks 310-350 and interconnected as illustrated, in great simplification, in FIG. 3, wherein FIG. 3 provides enough information for one skilled in the art to implement the distribution matrix in practice. The distribution matrices 104 and 106 are arranged in the apparatus 100 in a way that all 24 ports on one side of the distribution matrix 104, 106 are connected to the splitter 110 and all 100 ports on the opposite side of the distribution matrix 104, 106 are connected to the crossover matrix 108. It is, however within contemplation of the present invention that alternative arrangements of the distribution matrices 104 and 106, e.g. with different ratio of ports available on both sides of the matrices are also possible. One of such possible arrangements of the distribution matrices 104 and 106 is illustrated in FIG. 7.

The 2×2 distribution switching elements 302 are substantially the same known type as the crossover switching element 202 with the difference that the distribution switching element 302 used in the distribution matrices 104 and 106 has its relays 402 and 404 operated together, which means that it can only establish passthrough and crossover connections, the other, less important, difference is that in crossover switching elements ports C and D are in upright position and in distribution switching element ports C and D are parallel to ports A and B.

Figure 5:
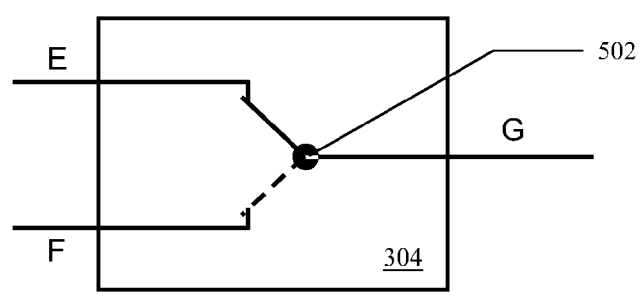
FIG. 5 is a schematic diagram illustrating a 2×1 switching element used in devices in accordance with one embodiment of the present invention.

The 2×1 distribution switch, as illustrated in FIG. 5, is very simple having relay 502 for connecting port G either to port E or to port F.

In a preferred embodiment the arrangement of the distribution switching elements 302 (2×2) and 304 (2×1) shown in FIG. 3 allows switching of line connected to any one of 100 inputs to any one of the 24 outputs. That means that as long as there is unused output port on the distribution matrix any of the subscriber lines, not being yet connected to an output port, can be connected to this unused port of the distribution matrix. In operation, it means that as long as there is unused port on the DSLAM side of the distribution matrix any of the subscriber lines, not having data services, can be connected to this unused port and the data services can be provided.

For the sake of clarity the side of the distribution matrix with 100 ports is called input side (input ports) and the side with 24 ports is called output side (output ports).

In alternative embodiment, as shown in FIG. 7, the arrangement of the 2×2 distribution switching elements 302 allows switching of line connected to any one input to the following number of outputs (numbers given below are valid for unconfigured distribution matrix):
each of the 64 inputs can reach 24 outputs,
the first 16 outputs (outputs 1-16) can be reached by all 64 inputs,
the second 16 outputs (outputs 17-32) can be reached by 16 different inputs
the remaining 32 outputs (outputs 33-64) can be reached by 8 different inputs.

In consequence of this arrangement, when 24-port DSLAM is used the 24 output ports of the distribution matrix that can be reached by any one of the 64 input ports are connected via the splitter 110 to the DSLAM 112 and the remaining 40 output ports are not used. That means that as long as at least one of the 24 output ports on the distribution matrix connected to the DSLAM 112 (via the splitter 110) is unused any of the subscriber lines, not being yet connected to the DSLAM 112, can be connected to this unused port of the distribution matrix and in consequence have data services provided. Of course this is not very efficient use of the distribution matrix and its efficiency can be improved by using a DSLAM having more than 24 input ports and connecting to those additional (i.e. ports $25^{th}$ and higher the easier reachable output ports of the distribution matrix illustrated in FIG. 7.

If the apparatus 100 is considered as a blackbox a line connected to a port on one cable side (i.e. connected to one side of the crossover matrix) can reach one specific port on the opposite cable side or one of 24 ports in the distribution matrix 104, 106 connected to the splitter 110 (if the distribution matrices 104, 106 are arranged as in the embodiment illustrated in FIG. 3).

In operation, an existing subscriber line already providing voice services (PSTN or ISDN) to the subscriber traverse the apparatus 100 via the crossover matrix 108. In this situation the crossover switching element 202 associated with the subscriber line is in passthrough position (port A is connected to port B and port C is connected to port D, i.e. relays 402 and 404 in positions 1a and 2a respectively) and the distribution matrices 104 and 106 are not involved in providing such PSTN or ISDN connection. If the subscriber wants to have broadband data services added the telecom operator from a remote location sends control signals to the crossover, 108, and distribution 104, 106 matrices. The crossover switching element 202 associated with said subscriber line switches its relays to positions 1b and 2b (i.e. connecting port A to port D and port B to port C—crossover position). In the crossover position an electric connection is established between the crossover switching element associated with the subscriber line and one port of the first distribution matrix 104 and between said crossover switching element and one port of the second distribution matrix 106. If there is a port available on the opposite side of the distribution matrix 104, 106 an electric connection to this available port is established respectively in each of the two distribution matrices 104, 106. The connections through the distribution matrices 104 and 106 are made symmetrically, which means that if there is connection in the first distribution matrix 104 there is a corresponding connection in the second distribution matrix 106. This means that if there is port available in the first distribution matrix 104, there is also port available in the second distribution matrix 106.

In the embodiment illustrated in FIG. 1 there are 24 ports connected to the splitter 110. Once the subscriber line is connected to the splitter 110 the circuit is closed—the same line was connected on both sides of the splitter, via the first and second distribution matrices. The function of the splitter 110 is to combine the high frequency broadband data signal provided by the DSLAM unit 112 in the downstream direction with the low frequency voice signal already present in the subscriber line and to split the data signal from the voice signal in the upstream direction.

The reason for 24 ports on the splitter side of the distribution matrices 104 and 106 is that typically a DSLAM aggregation unit (aggregation card) has 24 ports. However, it is possible to have DSLAM unit 112 installed in the apparatus 100 with different number of ports.

The subscriber line after traversing the splitter carries combined narrowband and low frequency voice signal for telephony and broadband and high frequency data signal for Internet, digital cable TV or other services.

In one embodiment the apparatus 100 is enclosed in a sealed, waterproof box comprising sealed connection cable stubs. As the apparatus 100 is controlled from remote location and does not require servicing it can be easily installed in the network. The only operations required for its installation are cutting the cables and connecting the signal cables on both sides of the apparatus, connecting the fiber optic cable or another data cable to the DSLAM port stubs, power supply and control signal cables. When sealed in a box the apparatus 100 can be deployed even in a harsh environment, which is a great advantage of the present solution as the device can be, for example, installed in the ground under the street cabinet and thus save the very important space within the very cramped street cabinet or avoiding the street cabinet at all.

In one embodiment 24 subscribers connected to the apparatus 100 can have the data services added to their voice signal. If the number of subscribers having data services reaches 24 and there is no room for further expansion a second apparatus 100 can be connected in series with the first one allowing for 24 more subscribers to have the broadband data services added. In this arrangement the 24 subscriber lines with data signal added in the first apparatus go straight through the crossover switching elements of the crossover matrix in the second apparatus.

In one embodiment said crossover matrix 108 is adapted to switch all subscriber lines directly to the main cable. This is achieved in a passthrough connection (i.e. the relays 402 and 404 are in positions 1a and 2a respectively) of all crossover switching elements 202 in said crossover matrix 108. In this configuration no broadband service is provided to the subscriber.

The apparatus 100 is adapted to disconnect the broadband service from a particular subscriber line by switching directly said subscriber line to the main cable via said crossover matrix. In this situation the released ports in the distribution matrices 104 and 106 can be reused.

In situations when power supply to the apparatus 100 is disrupted the subscribers don't get broadband service, but still have telephony from the central office. It is, however, envisaged that a backup power supply can be provided or that an alternative (back up) broadband service of (probably) lower bitrate can be provided from the central office.

With reference to FIG. 6 a-c it is shown how the relays of the switching elements 202, 302, 304 are controlled. The control of said relays is optimised in a way that it is not necessary to control n relays independently by n drivers but in the worst case only by 2-times square root of n. In effect e.g. 100 relays don't need 100 controllers but, in the worst case, 2×10=20 drivers. It is the number of relay elements (independent whether they 2×1 or 2×2) and the number of states they can have that determine the number of drivers required to control them. If all n 2×2 elements have only 2 states and if they are organized in one single control matrix acc. to FIG. 6 then it is necessary to have only sqrt(n) drivers. If a 2×2 element needs to have 3-4 states then it is necessary to drive the relays independently, which means the contribution to n is doubled. A 2×1 element can always have only two states. The fact that not all relays can be toggled together is not a problem because switching all relays at the same time could destroy the device due to very high power consumption. In consequence it would require power supply resources, which would be most of the time unused. The shown diodes 606, 608 and the coil 610 (for simplicity additional components have been left out) represent a logical gate (NOR function) in a way that there is only current through the coil 610 if both diodes 606, 608 have low potential. Operation and implementation in practice of the arrangement of FIG. 6 a-c is clear for one skilled in the art.

The functionality defined in the present invention may be implemented in a plurality of units or as part of other functional units. In consequence, the invention may be physically and functionally distributed between different units. Furthermore, although individually listed, a plurality of means, elements or method steps may be implemented by e.g. a single unit. Singular references do not exclude a plurality. Thus references to "a", "an", "first", "second" etc do not preclude a plurality.

The invention claimed is:

1. An apparatus for providing telecommunication and data services in a telecommunications network to a plurality of subscribers, the apparatus comprising:
   a crossover matrix comprising a plurality of crossover switching elements, and configured to be connected to a main cable and to a distribution cable;
   a first distribution matrix connected to the crossover matrix;
   a second distribution matrix connected to the crossover matrix;
   a Digital Subscriber Line Access Multiplexer (DSLAM);
   wherein the plurality of crossover switching elements in the crossover matrix and a plurality of distribution switching elements in the first and second distribution matrices are configured to be controlled remotely; and
   a splitter to combine or separate a low frequency voice signal and a high frequency data signal, and configured to:
      add data services to a subscriber line by switching the subscriber line from the crossover matrix to the first distribution matrix, and from the first distribution matrix to the second distribution matrix via the splitter, and from the second distribution matrix back to the crossover matrix; and
      receive the high frequency data signal from the DSLAM.

2. The apparatus of claim 1 wherein the DSLAM is connected to a broadband network via fibre optic link.

3. The apparatus of claim 1 wherein the DSLAM is connected to a broadband network via gigabit Ethernet link.

4. The apparatus of claim 1 wherein the DSLAM is configured to provide a high bitrate data service to the subscriber.

5. The apparatus of claim 4 wherein the high bitrate service is compliant with at least one of a Very-High-Data-Rate Digital Subscriber Line technology, and a Very-High-Data-Rate Digital Subscriber Line 2 technology.

6. The apparatus of claim 1 wherein each of the first and second distribution matrices comprises a plurality of ports that connect to the splitter and the crossover matrix, and wherein a number of ports in each of the first and second distribution matrices that are available to connect to the splitter is less than a number of ports in each of the distribution matrices that are available to connect to the crossover matrix.

7. The apparatus of claim 6 wherein each port in the distribution matrix that is connected to the crossover matrix can be connected to any one of the ports of the distribution matrix that is connected to the splitter.

8. The apparatus of claim 1 wherein the crossover matrix is configured to connect the subscriber line directly between the main cable and the subscriber cable, or to connect the subscriber line to one of the first and second distribution matrices.

9. The apparatus of claim 8 wherein the crossover matrix comprises a plurality of 2×2 crossover switching elements.

10. The apparatus of claim 9 wherein the crossover switching elements comprise relays, and wherein the relays in a 2×2 crossover switching element associated with one subscriber line are controlled independently.

11. The apparatus of claim 1 wherein the first and second distribution matrices comprise a plurality of 2×2 distribution switching elements and a plurality of 2×1 distribution switching elements, which are configured to connect the subscriber line being switched from the crossover matrix to the splitter, and from the splitter to the crossover matrix.

12. The apparatus of claim 11 wherein the 2×2 distribution switching elements comprise relays that are configured to be controlled together.

13. The apparatus of claim 1 wherein the apparatus is enclosed in a waterproof container comprising sealed connection cable stubs.

14. The apparatus of claim 1 wherein the crossover matrix is configured to switch all subscriber lines directly to the main cable.

15. The apparatus of claim 1 wherein the apparatus is configured to disconnect the high-frequency data signal from a given subscriber line by switching the subscriber line directly to the main cable via the crossover matrix.

16. A telecommunications network comprising:
  a broadband communications network to provide at least one data service; and
  an apparatus to provide telecommunication and data services to a plurality of subscribers, the apparatus comprising:
    a crossover matrix comprising a plurality of crossover switching elements, and configured to be connected to a main cable and to a distribution cable;
    a first distribution matrix connected to the crossover matrix;
    a second distribution matrix connected to the crossover matrix;
    a Digital Subscriber Line Access Multiplexer (DSLAM);
    wherein the plurality of crossover switching elements in the crossover matrix and a plurality of distribution switching elements in the first and second distribution matrices are configured to be controlled remotely; and
    a splitter to combine or separate a low frequency voice signal and a high frequency data signal, and configured to:
      add data services to a subscriber line by switching the subscriber line from the crossover matrix to the first distribution matrix, and from the first distribution matrix to the second distribution matrix via the splitter, and from the second distribution matrix back to the crossover matrix; and
      receive the high frequency data signal from the DSLAM.

17. The telecommunications network of claim 16 wherein the DSLAM is connected to a broadband network via fibre optic link.

18. The telecommunications network of claim 16 wherein the DSLAM is connected to a broadband network via gigabit Ethernet link.

19. The telecommunications network of claim 16 wherein the DSLAM is configured to provide a high bitrate data service to subscribers.

20. The telecommunications network of claim 16 wherein the high bitrate service is compliant with one of a Very-High-Data-Rate Digital Subscriber Line technology, and a Very-High-Data-Rate Digital Subscriber Line 2 technology.

21. The telecommunications network of claim 16 wherein each of the first and second distribution matrices comprises a plurality of ports that connect to the splitter and the crossover matrix, and wherein a number of ports in each of the first and second distribution matrices that are available to connect to the splitter is less than a number of ports in each of the distribution matrices that are available to connect to the crossover matrix.

22. The telecommunications network of claim 16 wherein each port in the distribution matrix that is connected to the crossover matrix can be connected to any one of the ports of the distribution matrix that is connected to the splitter.

23. The telecommunications network of claim 16 wherein the crossover matrix is configured to connect the subscriber line directly between the main cable and the subscriber cable, or to connect the subscriber line to one of the first and second distribution matrices.

24. The telecommunications network of claim 23 wherein the crossover matrix comprises a plurality of 2×2 crossover switching elements.

25. The telecommunications network of claim 24 wherein the crossover switching elements comprise relays, and wherein the relays in a 2×2 crossover switching element associated with one subscriber line are controlled independently.

26. The telecommunications network of claim 16 wherein the first and second distribution matrices comprise a plurality of 2×2 distribution switching elements, which are configured to connect the subscriber line being switched from the crossover matrix to the splitter, and from the splitter to the crossover matrix.

27. The telecommunications network of claim 26 wherein the first and second distribution matrices further comprise a plurality of 2×1 distribution switching elements.

28. The telecommunications network of claim 26 wherein the 2×2 distribution switching elements comprise relays that are configured to be controlled together.

29. The telecommunications network of claim 16 wherein the apparatus is enclosed in a waterproof container comprising sealed connection cable stubs.

30. The telecommunications network of claim 16 wherein the apparatus comprises a first apparatus, and further comprising at least a second apparatus configured to provide telecommunication and data services to the subscribers, the second apparatus being connected in series to the first apparatus.

31. The telecommunications network of claim 16 wherein the crossover matrix of the apparatus is configured to switch all subscriber lines directly to the main cable.

32. The telecommunications network of claim 16 wherein the apparatus is configured to disconnect the high-frequency data signal from a given subscriber line by switching the subscriber line directly to the main cable via the crossover matrix.

33. A method of operating a telecommunications network in which a broadband network provides at least one data service, and wherein a plurality of subscriber lines are connected to the broadband network through a crossover matrix including a plurality of 2×2 crossover switching elements that, responsive to a request, adds a data service to the subscriber line, the method comprising:

controlling a crossover switching element associated with a subscriber line to electrically switch the subscriber line on a subscriber cable side of the crossover matrix to a second distribution matrix, and a main cable side of the crossover matrix to a first distribution matrix;

controlling the first and second distribution matrices to switch the subscriber line to respective ports that are connected to a splitter that receives a low frequency voice signal and a high frequency data signal;

combining the low frequency voice signal with the high frequency data signal received from DSLAM, receiving control signals from a remote location at the crossover switching elements of the crossover matrix, and at the distribution switching elements of the first and second distribution matrices.

34. The method of claim 33 further comprising the DSSLAM providing a high bitrate data service to the subscribers.

35. The method of claim 34 wherein the high bitrate data services provided are compliant with a Very-High-Data-Rate Digital Subscriber Line technology, or a Very-High-Data-Rate Digital Subscriber Line 2 technology.

* * * * *